(12) United States Patent
Ono

(10) Patent No.: US 10,156,484 B2
(45) Date of Patent: Dec. 18, 2018

(54) TEMPERATURE MEASUREMENT DEVICE

(71) Applicant: DENSO CORPORATION, Kariya, Aichi-pref. (JP)

(72) Inventor: Yoshihisa Ono, Kariya (JP)

(73) Assignee: DENSO CORPORATION, Kariya (JP)

( * ) Notice: Subject to any disclaimer, the term of this patent is extended or adjusted under 35 U.S.C. 154(b) by 198 days.

(21) Appl. No.: 15/126,357

(22) PCT Filed: Sep. 19, 2015

(86) PCT No.: PCT/JP2015/001534
§ 371 (c)(1),
(2) Date: Sep. 15, 2016

(87) PCT Pub. No.: WO2015/151436
PCT Pub. Date: Oct. 8, 2015

(65) Prior Publication Data
US 2017/0082504 A1    Mar. 23, 2017

(30) Foreign Application Priority Data
Mar. 31, 2014  (JP) .................................. 2014-073223

(51) Int. Cl.
*G01K 13/02* (2006.01)
*F02D 41/24* (2006.01)
(Continued)

(52) U.S. Cl.
CPC ............ *G01K 13/02* (2013.01); *F01N 11/002* (2013.01); *F02D 41/1446* (2013.01);
(Continued)

(58) Field of Classification Search
CPC ...... G01K 13/02; G01K 1/20; G01K 2205/04; F01N 11/002; F01N 2560/06;
(Continued)

(56) References Cited

U.S. PATENT DOCUMENTS 4,638,658 A *   1/1987  Otobe ................. F02D 41/1495
                                                         123/445
7,802,422 B2 *  9/2010  Colignon ........... B01D 53/9495
                                                          60/295
(Continued)

FOREIGN PATENT DOCUMENTS

EP      2 458 167       5/2012
JP      2006-022730     1/2006

*Primary Examiner* — Lisa Caputo
*Assistant Examiner* — Philip Cotey
(74) *Attorney, Agent, or Firm* — Nixon & Vanderhye P.C.

(57) ABSTRACT

An exhausted gas temperature measurement device includes a first exhausted gas temperature output portion, a second exhausted gas temperature output portion, an over-correction determining portion, and a measurement value output portion. The first exhausted gas temperature output portion outputs an uncorrected value that corresponds to an output of a temperature sensor. The second exhausted gas temperature output portion outputs a corrected value based on a response lag model. The over-correction determining portion determines, based on the uncorrected value and the corrected value, whether the over-correction occurs. The measurement value output portion outputs the corrected value as the measurement value when the over-correction determining portion does not determine that the over-correction occurs, and the measurement value output portion outputs a value different from the corrected value when the over-correction determining portion determines that the over-correction occurs. Accordingly, a deterioration of an accuracy of the measurement value due to the over-correction can be limited to a maximum extent.

4 Claims, 3 Drawing Sheets

(51) Int. Cl.
  *F02D 41/14*  (2006.01)
  *G01K 1/20*  (2006.01)
  *F01N 11/00*  (2006.01)

(52) U.S. Cl.
  CPC ........... *F02D 41/2474* (2013.01); *G01K 1/20* (2013.01); *F01N 2560/06* (2013.01); *F02D 2041/1431* (2013.01); *G01K 2205/04* (2013.01); *Y02T 10/47* (2013.01)

(58) Field of Classification Search
  CPC ............. F02D 41/1446; F02D 41/2474; F02D 2041/1431; Y02T 10/47
  See application file for complete search history.

(56) References Cited

U.S. PATENT DOCUMENTS

| | | | |
|---|---|---|---|
| 2006/0142932 A1 | 6/2006 | Yasui | |
| 2009/0193791 A1* | 8/2009 | Colignon | B01D 53/9495 60/286 |
| 2011/0203411 A1* | 8/2011 | Maruyama | F16H 59/72 74/731.1 |
| 2012/0290192 A1* | 11/2012 | Okazaki | F02D 41/1454 701/103 |
| 2014/0005882 A1* | 1/2014 | Aoki | F02D 41/1441 701/33.1 |

\* cited by examiner

TEMPERATURE MEASUREMENT DEVICE

CROSS REFERENCE TO RELATED APPLICATION

This application is the U.S. national phase of International Application No. PCT/JP2015/001534 filed Mar. 19, 2015, which designated the U.S. and claims priority to Japanese Patent Application No. 2014-073223 filed on Mar. 31, 2014, the entire contents of each of which are hereby incorporated by reference.

TECHNICAL FIELD

The present disclosure relates to a temperature measurement device configured to output a measurement value of temperature of a fluid flowing in a fluid passage of an internal combustion engine based on an output of a temperature sensor attached to the fluid passage.

BACKGROUND ART

A temperature measurement device configured to fix (compensate for) a response lag of a temperature sensor attached to an exhausted gas passage is known (for example, refer to Patent Document 1).

A response time of this kind of temperature sensor (e.g. thermocouple) varies based on a flow rate of an exhausted gas. Therefore, if the response lag is fixed as described above, a gap between an actual temperature and a measurement value may be big depending on a driving condition of an internal combustion engine. In a configuration in which the response time is variable according to the flow rate, a load of processing for measuring (obtaining) the flow rate may increase. On the other hand, in a configuration in which the response time is set to be constant, an over-correction may occur.

PRIOR ART DOCUMENT

Patent Document

Patent Document 1: WO 2011/048632 A

SUMMARY OF THE INVENTION

The present disclosure is done with considering the situation described above as an example, and the objective is to provide a temperature measurement device fixing a response lag of a temperature sensor adequately and being capable of limiting a deterioration of an accuracy of a measurement value due to an over-correction to a maximum extent.

According to an aspect of the present disclosure, a temperature measurement device outputs a measurement value of a temperature of a fluid, which flows in a fluid passage of an internal combustion engine, based on an output of a temperature sensor disposed in the fluid passage. Specifically, the temperature measurement device includes a first temperature output portion, a second temperature output portion, an over-correction determining portion, and a measurement value output portion. In this specification, "measurement" may be expressed as "obtainment" or "detection" alternatively.

The first temperature output portion outputs an uncorrected value corresponding to the output of the temperature sensor. The second temperature output portion outputs a corrected value. The "corrected value" is a value calculated by correcting the uncorrected value based on a "response lag model" that is a calculation model of the response lag of the temperature sensor.

The over-correction determining portion determines whether an over-correction occurs in the corrected value. The measurement value output portion outputs the corrected value as the measurement value when the over-correction determining portion determines that the over-correction does not occur, and the measurement value output portion outputs a value different from the corrected value when the over-correction determining portion determines that the over-correction occurs.

In the temperature measurement device of the present disclosure having this configuration, the first temperature output portion outputs the uncorrected value corresponding to the output of the temperature sensor. The uncorrected value is a value before being corrected by the second temperature output portion, i.e. "a value corresponding to a temperature of the fluid before the correction". The second temperature output portion calculates the corrected value by correcting the uncorrected value based on the response lag model. Moreover, the second temperature output portion outputs the corrected value calculated.

The over-correction determining portion determines, based on the uncorrected value and the corrected value, whether the over-correction occurs in the corrected value. When the over-correction determining portion determines that the over-correction does not occur, the measurement value output portion outputs the corrected value as the measurement value. Accordingly, the response lag of the temperature sensor is fixed (compensated) adequately.

On the other hand, when the over-correction determining portion determines that the over-correction occurs, the measurement value output portion outputs the value (e.g. the uncorrected value) different from the corrected value as the measurement value. Accordingly, a deterioration of an accuracy of the measurement value due to the over-correction can be limited to a maximum extent.

EMBODIMENTS FOR EXPLOITATION OF THE INVENTION

Hereinafter, an embodiment embodying the present disclosure will be described referring to drawings. Various changes are described in a bundle at the last.

Figure 1:
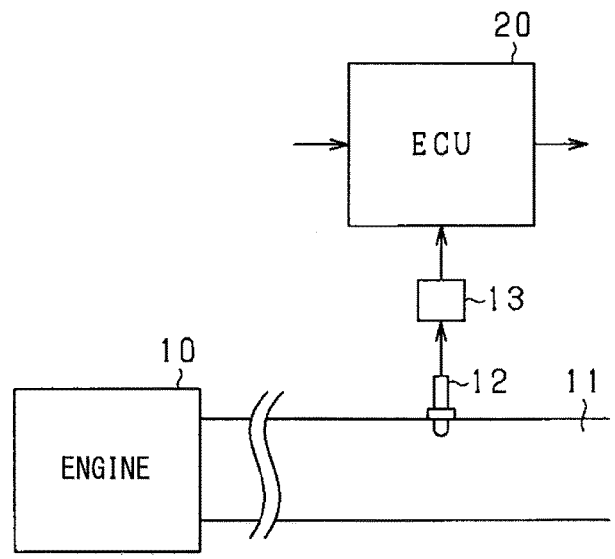
FIG. 1 is a schematic diagram illustrating a configuration of a whole of a system of the present disclosure.

A whole system of the embodiment will be described below. As shown in FIG. 1, an engine 10 that is a spark-ignition type internal combustion engine is connected to an exhausted gas passage 11. An exhausted gas temperature sensor 12 is attached to the exhausted gas passage 11. The exhausted gas temperature sensor 12 is an example of a temperature sensor (specifically, a thermocouple) and is configured to generate an output corresponding to a temperature of an exhausted gas flowing in the exhausted gas passage 11.

The exhausted gas temperature sensor 12 is connected to an engine ECU 20 through a signal processing portion 13. The signal processing portion 13 includes therein a microcomputer formed of a CPU, a ROM, a RAM, and a non-volatile memory that is rewritable during energization (e.g. flush memory or EEPROM (registered trademark)), for example. The signal processing portion 13 is configured to process an output signal of the exhausted gas temperature sensor 12 and to output a processed signal to the engine ECU 20.

The engine ECU 20 includes therein a microcomputer formed of a CPU, a ROM, a RAM, and a non-volatile memory described above, for example. The engine ECU 20 is electrically connected with various sensors excepting the exhausted gas temperature sensor 12. Moreover, the engine ECU 20 is electrically connected with actuation portions such as an injector that is not illustrated in drawings. The engine ECU 20 is configured to control actuations of the above-described actuation portions based on outputs of the above-described various sensors.

Figure 2:
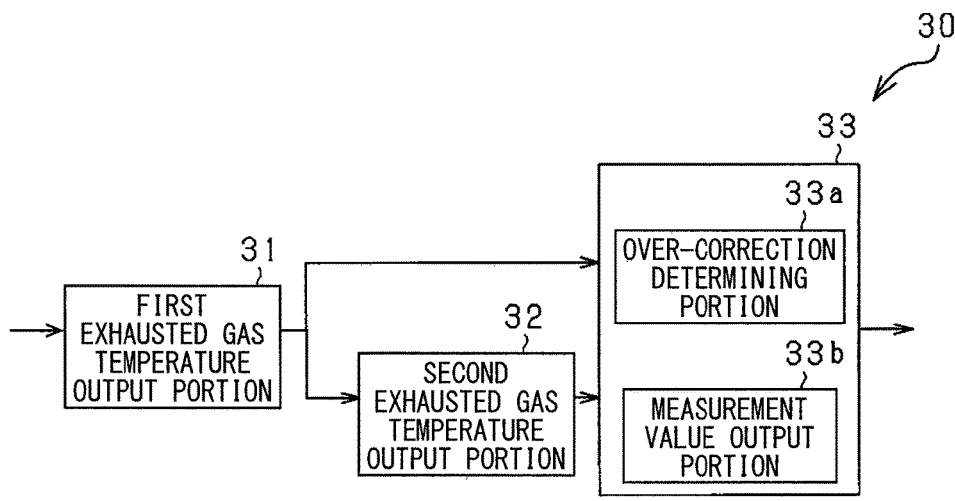
FIG. 2 is a schematic function block diagram illustrating a temperature measurement device of a signal processing portion according to an embodiment of the present disclosure.

According to FIG. 2, an exhausted gas temperature measurement device 30 according to the embodiment of the temperature measurement device of the present disclosure is configured to output a measurement value of the exhausted gas temperature (hereinafter, referred to as just "measurement value". The "measurement value" may also be referred to as "obtained value" or "detected value") based on the output of the exhausted gas temperature sensor 12. Specifically, the exhausted gas temperature measurement device 30 includes a first exhausted gas temperature output portion 31, a second exhausted gas temperature output portion 32, and a third exhausted gas temperature output portion 33. In the present embodiment, the first exhausted gas temperature output portion 31, the second exhausted gas temperature output portion 32, and the third exhausted gas temperature output portion 33 are provided as function blocks built in the signal processing portion 13 (specifically, the CPU mounted to the signal processing portion 13).

The first exhausted gas temperature output portion 31 may be used as an example of a first temperature output portion that is configured to output an uncorrected value (a value before receiving a correction processing by the second exhausted gas temperature output portion 32) corresponding to the output of the exhausted gas temperature sensor 12. Specifically, the first exhausted gas temperature output portion 31 is configured to output the above-described uncorrected value corresponding to an output voltage of the exhausted gas temperature sensor 12 by comparing the output voltage with a predetermined map (a correlation map between the output voltage of the exhausted gas temperature sensor 12 and the exhausted gas temperature corresponding to the output voltage).

The second exhausted gas temperature output portion 32 may be used as an example of a second temperature output portion that is configured to calculate a corrected value by correcting the uncorrected value based on a response lag model and to output the corrected value calculated. The "response lag model" is a calculation model built on a basis of a physical model of a lag in response (typically, a first order lag) of the exhausted gas temperature sensor 12. Details of this response lag model have been already known at the time of application of the present disclosure and form a technological common sense of those skilled in the art. Accordingly, detailed description about the response lag model is skipped in this specification, however, the present application may be based on and incorporates herein by reference JP 4373909 (U.S. Pat. No. 7,305,819/EP 1676991), for example.

The third exhausted gas temperature output portion 33 is configured to output the above-described measurement value based on the above-described uncorrected value and corrected value. Specifically, the third exhausted gas temperature output portion 33 includes an over-correction determining portion 33a and a measurement value output portion 33b.

The over-correction determining portion 33a is configured to determine, based on the uncorrected value and the corrected value, whether an over-correction occurs in the corrected value. Specifically, the over-correction determining portion 33a is configured to determine whether the over-correction occurs, based on a situation of a change of the uncorrected value (more specifically, a direction of the change i.e. sign) and a situation of a change of the corrected value (more specifically, a direction of the change i.e. sign).

The measurement value output portion 33b is configured to output the measurement value according to a result of the determination of the over-correction determining portion 33a. Specifically, the measurement value output portion 33b outputs the corrected value as the measurement value when the over-correction determining portion 33a determines that the over-correction does not occur, and the measurement value output portion 33b outputs a value different from the corrected value when the over-correction determining portion 33a determines that the over-correction occurs.

Effects of the configuration of the present embodiment will be described below. In the illustrated flowchart, "step" is described as "S" for short.

In the exhausted gas temperature measurement device 30 having the above-described configuration, the first exhausted gas temperature output portion 31 outputs the uncorrected value corresponding to the output of the exhausted gas temperature sensor 12 to the second exhausted gas temperature output portion 32 and the third exhausted gas temperature output portion 33. The uncorrected value is a value before being corrected by the second exhausted gas temperature output portion 32, i.e. "a value corresponding to the exhausted gas temperature before the correction".

The second exhausted gas temperature output portion 32 calculates the corrected value by correcting the uncorrected value based on the response lag model. The second exhausted gas temperature output portion 32 outputs the corrected value calculated to the third exhausted gas temperature output portion 33.

The uncorrected value outputted by the first exhausted gas temperature output portion 31 and the corrected value outputted by the second exhausted gas temperature output portion 32 are inputted to the third exhausted gas temperature output portion 33. The over-correction determining portion 33a of the third exhausted gas temperature output portion 33 determines, based on the uncorrected value and the corrected value, whether the over-correction occurs. The measurement value output portion 33b outputs the measurement value according to the result of the determination of the over-correction determining portion 33a.

Figure 3:
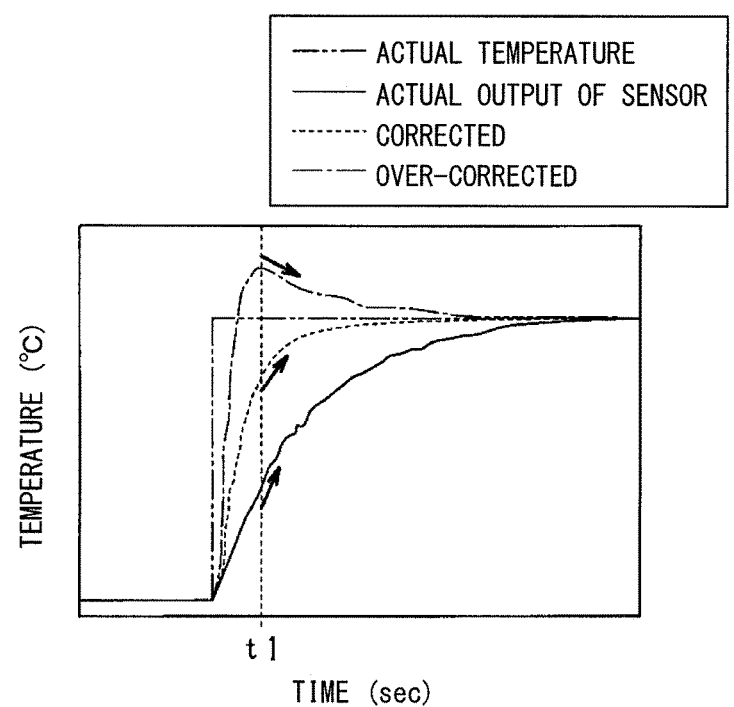
FIG. 3 is a diagram illustrating an outline of an actuation of the temperature measurement device according to the embodiment.

FIG. 3 is a graph illustrating changes of the uncorrected value and the corrected value as an example where an actual temperature of the exhausted gas changes (rises) in a step shape. In the drawing, the line with alternating dashes and two dots represents the actual temperature of the exhausted gas, the solid line represents the uncorrected value, and the dashed line and dot-and-dash line represent the corrected value.

As shown in FIG. 3, the uncorrected value corresponding to the output of the exhausted gas temperature sensor 12 has the response lag (typically, the first order lag) compared to the actual temperature of the exhausted gas. If the response lag can be fixed (compensated) adequately by the above-described response lag model, a measurement accuracy of the temperature of the exhausted gas is improved as represented by the dashed line in the drawing. When the over-correction determining portion 33a determines that the over-correction does not occur, the measurement value output portion 33b outputs the corrected value as the measurement value. According to this, the response lag of the exhausted gas temperature sensor 12 is fixed (compensated) adequately.

On the other hand, the over-correction may occur depending on a driving condition of the engine 10 as represented by the dot-and-dash line in FIG. 3. When the over-correction determining portion 33a determines that the over-correction occurs, the measurement value output portion 33b outputs the value different from the corrected value (specifically, the uncorrected value) as the measurement value. According to this, a deterioration of the accuracy of the measurement value due to the over-correction may be limited to a maximum extent.

The occurrence of the over-correction is determined based on the situation of the change of the uncorrected value and the situation of the change of the corrected value. Specifically, when the over-correction occurs, the corrected value converges on the actual temperature of the exhausted gas after the corrected value "overshoots" once, as represented by the dot-and-dash line in FIG. 3. Accordingly, at a time t1 in FIG. 3, a peak is present in the corrected value due to the over-correction, and the direction of the change of the corrected value is different between before the peak and after the peak. On the other hand, as illustrated by the solid line in FIG. 3, the direction of the change of the uncorrected value that has a relationship of the first order lag with the actual temperature of the exhausted gas changing in the step shape is constant.

When the change of the uncorrected value and the change of the corrected value have same sign (i.e. both a change rate of the uncorrected value and a change rate of the corrected value are positive or negative), the over-correction determining portion 33a determines that the over-correction does not occur. On the other hand, when the change of the uncorrected value and the change of the corrected value have different signs (i.e. one change rate is positive, and the other change rate is negative), the over-correction determining portion 33a determines that the over-correction occurs. According to this, the over-correction can be determined adequately by a simple processing. In the example shown in the FIG. 3, the corrected value is used as the measurement value before the time t1. On the other hand, the value different from the corrected value (specifically, the uncorrected value) is used as the measurement value after the time t1.

In the present embodiment, if an adaptability test under a situation (or a similar situation) where the exhausted gas temperature sensor 12 is attached to an actual attaching position in a vehicle is not conducted, the measurement value based on the output of the exhausted gas temperature sensor 12 is obtained with relatively high accuracy. Moreover, in the present embodiment, if a response time is not variable depending on a flow rate, the measurement value of the temperature of the exhausted gas based on the output of the exhausted gas temperature sensor 12 is obtained with relatively high accuracy. Therefore, according to the present embodiment, a calculation load in the above-described CPU decreases, and the number of steps of the adaptability test of the engine ECU 20 decreases.

Figure 4:
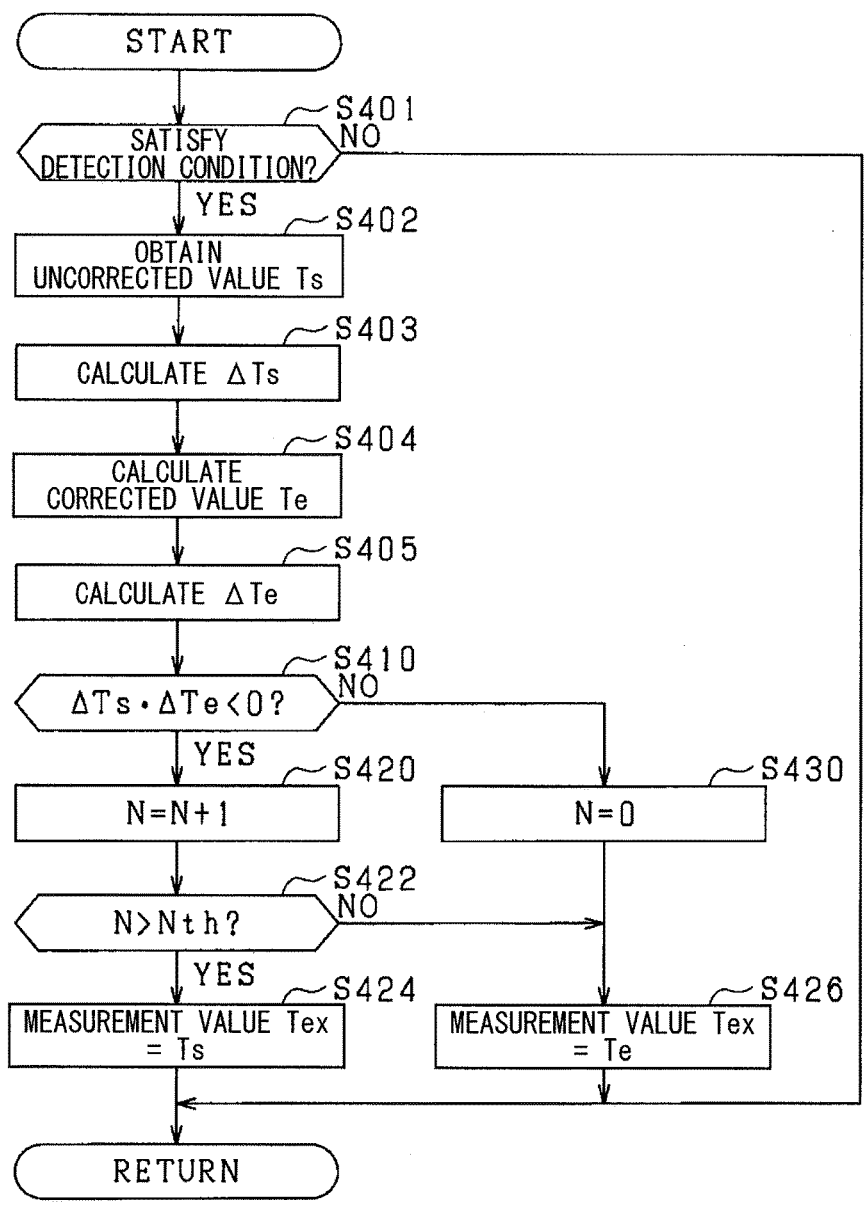
FIG. 4 is a flowchart illustrating the outline of the actuation of the temperature measurement device according to the embodiment.

FIG. 4 is a flowchart in which the above described actuations are embodied. The routine described by the flowchart in FIG. 4 is repeatedly performed every predetermined time period by the above-described CPU mounted to the signal processing portion 13.

When the routine is started, at step 401, it is determined whether a condition for detecting the temperature of the exhausted gas is satisfied (e.g. whether a predetermined time elapses after a starting up of the engine 10). When the detection condition is not satisfied (step 401: NO), all processes after step 402 are skipped, and the process of the routine ends once. Therefore, description of the actuation is continued below, as the detection condition is satisfied (step 401: YES).

At step 402, an uncorrected value Ts is obtained based on the output of the exhausted gas temperature sensor 12. The uncorrected value Ts obtained is accumulated (stored) in the above-described non-volatile memory in turn in chronological order.

Next, at step 403, a change $\Delta$Ts between the uncorrected value Ts obtained at present time and that obtained last time is calculated. When the value obtained this time is defined as Ts(k), and when the value of last time is defined as Ts(k−1), $\Delta$Ts is calculated by an equation below.

$$\Delta Ts = Ts(k) - Ts(k-1)$$

Subsequently, at step 404, a corrected value Te is calculated by the second exhausted gas temperature output portion 32 based on the uncorrected value Ts obtained this time. The corrected value Te calculated is accumulated (stored) in the above-described non-volatile memory in turn in chronological order.

At step 405, a change $\Delta$Te of the corrected value Te calculated this time from a value of last time is calculated. When the value calculated this time is defined as Te(k), and when the value of last time is defined as Te(k−1), $\Delta$Te is calculated by an equation below.

$$\Delta Te = Te(k) - Te(k-1)$$

When the change $\Delta$Ts of the uncorrected value and the change $\Delta$Te of the corrected value are calculated as described above, the process moves to step 410. At step 410, it is determined whether a sign of a product of the change $\Delta$Ts of the uncorrected value and the change $\Delta$Te of the corrected value is minus. When the change $\Delta$Ts of the uncorrected value and the change $\Delta$Te of the corrected value have the same sign, the product of the two values is positive (step 410: NO). On the other hand, When the change $\Delta$Ts of the uncorrected value and the change $\Delta$Te of the corrected value have different signs, the product of the two values is negative (step 410: YES). However, the above-described result of the determination may not be reliable because of an effect of a noise, for example.

When the product of the change $\Delta$Ts of the uncorrected value and the change $\Delta$Te of the corrected value is negative (step 410: YES), the process moves to step 420, and a value of a counter N is incremented by 1. When the value of the counter N exceeds a predetermined value Nth (step 422: YES), the over-correction determining portion 33a determines that the over-correction occurs. In this case, the process moves to step 424, the uncorrected value Ts obtained this time is outputted as a measurement value Tex, and the routine ends once. On the other hand, when the value of the counter N does not exceed the predetermined value Nth (step 422: NO), the occurrence of the over-correction is not determined. In this case, the process moves to step 426, the corrected value Te calculated this time is outputted as the measurement value Tex, and the routine ends once.

On the other hand, the product of the change ΔTs of the uncorrected value and the change ΔTe of the corrected value is positive (step 410: NO), the process moves to step 430, and the value of the counter N is reset. Subsequently, the process moves to step 426, the corrected value Te calculated this time is outputted as the measurement value Tex, and the routine ends once.

Several typical examples of modification will be described below. In the examples of modification, a part that has a similar configuration and a similar function may be assigned with the same reference numeral as the above described embodiment. In the descriptions of such part, the descriptions of the above-described embodiment may be used as far as a technological inconsistency is not generated. Moreover, it is nothing to say that modifications also are not limited to those described below. A part of the above-described embodiment and all or a part of the several modifications may be arbitrarily applied in a compositive manner as far as a technological inconsistency is not generated.

The present disclosure is not limited to the above-described specific device configuration and the aspect of the actuation (control). For example, the exhausted gas temperature sensor 12 is not limited to the thermocouple as far as having a characteristic of the first order lag. For example, a thermistor may be also adequately used as the exhausted gas temperature sensor 12. Moreover, when the occurrence of the over-correction is determined, the measurement value output portion 33b may output a value calculated based on the uncorrected value and the corrected value (intermediate value: e.g. average value) instead of the uncorrected value.

The present disclosure does not do away with conducting of the adaptability test of the exhausted gas temperature sensor 12. The present disclosure can be adequately adapted to a configuration in which it is considered as a prerequisite that an adaptability of the response lag model is adequately assured by the adaptability test. Accordingly, the measurement accuracy of the temperature of the exhausted gas is further improved.

The exhausted gas temperature measurement device 30 is provided in the engine ECU 20.

Moreover, the present disclosure is not limited to measurement (obtainment) of the temperature of the exhausted gas. The present disclosure may be adequately adopted for measuring (obtaining) a temperature of an arbitrary fluid (e.g. intake air, cooling water, lubricant) flowing according to the driving of the engine 10. The temperature of the exhausted gas has a variable range broader than variable ranges of temperature of other fluids. Therefore, when the present disclosure is applied for measuring the temperature of the exhausted gas, the engine 10 (including a system for supplying and discharging air) can be controlled well.

Needless to say, modifications which are not particularly referred to are also encompassed in the technical scope of the present disclosure, as far as the disclosure is not modified in essence. Those components which partially constitute means for solving the problems to be solved by the present disclosure and are operationally or functionally expressed encompass not only the specific structures disclosed above-described embodiment and modifications but also any other structures that can implement the operations or functions of the components.

What is claimed is:

1. A temperature measurement device outputting a measurement value of a temperature of a fluid flowing in a fluid passage of an internal combustion engine based on an output of a temperature sensor disposed in the fluid passage, the temperature measurement device comprising:
    a first temperature output portion outputting an uncorrected value that corresponds to the output of the temperature sensor;
    a second temperature output portion outputting a corrected value calculated by correcting the uncorrected value based on a response lag model that is a calculation model of a response lag of the temperature sensor;
    an over-correction determining portion determining whether an over-correction occurs in the corrected value based on the uncorrected value and the corrected value; and
    a measurement value output portion outputting the corrected value as the measurement value when the over-correction determining portion determines that the over-correction does not occur, and the measurement value output portion outputs a value different from the corrected value as the measurement value when the over-correction determining portion determines that the over-correction occurs; wherein
    the over-correction determining portion determines, based on a sign of the change of the uncorrected value and a sign of the change of the corrected value, whether the over-correction occurs in the corrected value.

2. The temperature measurement device according to claim 1, wherein the measurement value output portion outputs the uncorrected value as the measurement value when the over-correction determining portion determines that the over-correction occurs.

3. The temperature measurement device according to claim 1, wherein:
    when the change of the uncorrected value and the change of the corrected value have same sign, the over-correction determining portion determines that the over-correction does not occur; and
    when the change of the uncorrected value and the change of the corrected value have different signs, the over-correction determining portion determines that the over-correction occurs.

4. The temperature measurement device according to claim 1, wherein:
    the fluid is an exhaust gas of the internal combustion engine and the fluid passage of the internal combustion engine is an exhaust gas passage;
    the uncorrected value corresponds to a value of the temperature of the exhaust gas;
    the corrected value, calculated by correcting the uncorrected value, corresponds to a corrected value of the temperature of the exhaust gas.

* * * * *